(12) United States Patent
Moon

(10) Patent No.: US 10,605,377 B2
(45) Date of Patent: Mar. 31, 2020

(54) SAFETY FAUCET FOR HOT WATER

(71) Applicant: CLOVER CO., LTD., Anyang-si, Gyeonggido (KR)

(72) Inventor: Young Mu Moon, Gunpo-si (KR)

(73) Assignee: CLOVER CO., LTD., Anyang-si, Gyeonggido (KR)

( * ) Notice: Subject to any disclaimer, the term of this patent is extended or adjusted under 35 U.S.C. 154(b) by 0 days.

(21) Appl. No.: 16/097,271

(22) PCT Filed: May 9, 2016

(86) PCT No.: PCT/KR2016/004783
§ 371 (c)(1),
(2) Date: Oct. 28, 2018

(87) PCT Pub. No.: WO2017/188495
PCT Pub. Date: Nov. 2, 2017

(65) Prior Publication Data
US 2019/0113152 A1 Apr. 18, 2019

(30) Foreign Application Priority Data

Apr. 29, 2016 (KR) .................. 10-2016-0053391

(51) Int. Cl.
*F16K 35/00* (2006.01)
*F16K 35/02* (2006.01)
(Continued)

(52) U.S. Cl.
CPC ............... *F16K 35/02* (2013.01); *B67D 3/00* (2013.01); *B67D 3/04* (2013.01); *F16K 1/34* (2013.01);
(Continued)

(58) Field of Classification Search
CPC ........ F16K 41/103; F16K 35/02; F16K 21/04; F16K 1/34; B67D 3/00; B67D 3/04;
(Continued)

(56) References Cited

U.S. PATENT DOCUMENTS

| | | | | |
|---|---|---|---|---|
| 2,097,020 A | * | 10/1937 | Cornelius | B67D 1/1461 138/40 |
| 5,449,144 A | * | 9/1995 | Kowalics | B67D 1/125 251/104 |
| 5,470,044 A | * | 11/1995 | Chi | B67D 3/043 222/153.1 |
| 6,082,598 A | * | 7/2000 | Lee | B67D 3/04 222/153.14 |
| 6,793,195 B2 | * | 9/2004 | Dou | F16K 31/52408 251/110 |

(Continued)

FOREIGN PATENT DOCUMENTS

| KR | 20-0289040 Y1 | 9/2002 |
|---|---|---|
| KR | 10-0889807 B1 | 3/2009 |

(Continued)

OTHER PUBLICATIONS

International Search Report for PCT/KR2016/004783 dated Dec. 19, 2016 from Korean Intellectual Property Office.

*Primary Examiner* — Charles Cheyney
(74) *Attorney, Agent, or Firm* — Revolution IP, PLLC

(57) ABSTRACT

A safety faucet has a safety button which is positioned in front of a lever and slidingly moves in the front/back direction, and when the safety button is pressed, a cap contacting part on the lower end of the safety button rotates while forming a support point with respect to the upper surface of an upper cap; and has a fixed pin, which passes through an insertion groove formed on the upper end of an operation shaft, fixed together with the body of the lever, thereby preventing the lever from shaking left and right.

2 Claims, 12 Drawing Sheets

(51) Int. Cl.
    *B67D 3/04*         (2006.01)
    *F16K 31/44*       (2006.01)
    *F16K 21/04*       (2006.01)
    *B67D 3/00*         (2006.01)
    *F25D 25/00*       (2006.01)
    *F16K 1/34*        (2006.01)

(52) U.S. Cl.
    CPC .............. *F16K 21/04* (2013.01); *F16K 31/44* (2013.01); *F25D 25/00* (2013.01)

(58) Field of Classification Search
    CPC ...... B67D 3/043; B67D 3/045; B67D 3/0058; B67D 1/1466
    USPC .......................... 222/509, 518, 559; 251/263
    See application file for complete search history.

(56) References Cited

U.S. PATENT DOCUMENTS

| | | | | |
|---|---|---|---|---|
| 6,880,797 | B2* | 4/2005 | Yui | F16K 31/52 |
| | | | | 251/103 |
| 6,962,319 | B2* | 11/2005 | Zheng | B67D 1/0878 |
| | | | | 222/153.14 |
| 8,418,991 | B2* | 4/2013 | Meyer | B67D 3/0058 |
| | | | | 251/263 |
| 9,061,876 | B2* | 6/2015 | Meyer | B67D 3/0058 |

FOREIGN PATENT DOCUMENTS

| | | |
|---|---|---|
| KR | 10-1120358 B1 | 3/2012 |
| KR | 10-1303923 B1 | 9/2013 |
| KR | 10-2015-0031676 A | 3/2015 |

* cited by examiner

[FIG. 1]
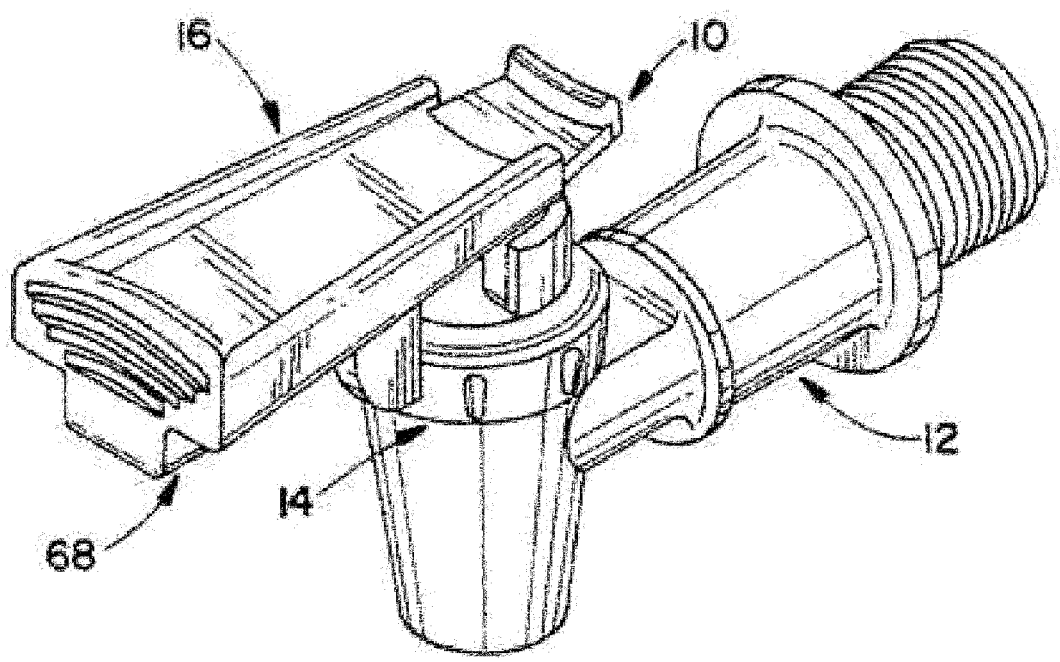

[FIG. 2]
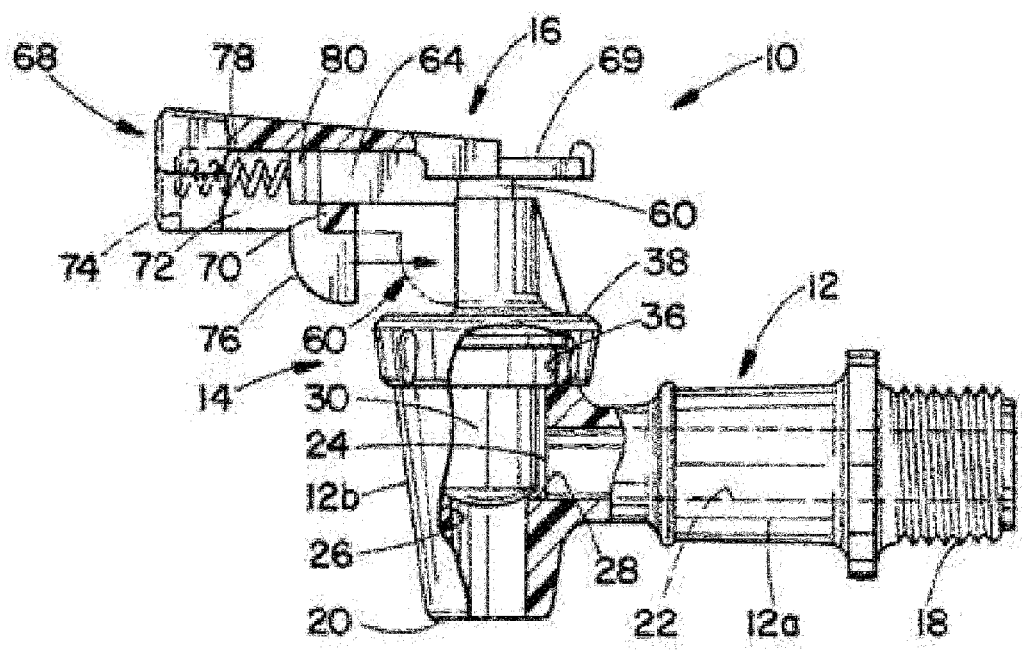

[FIG. 3]
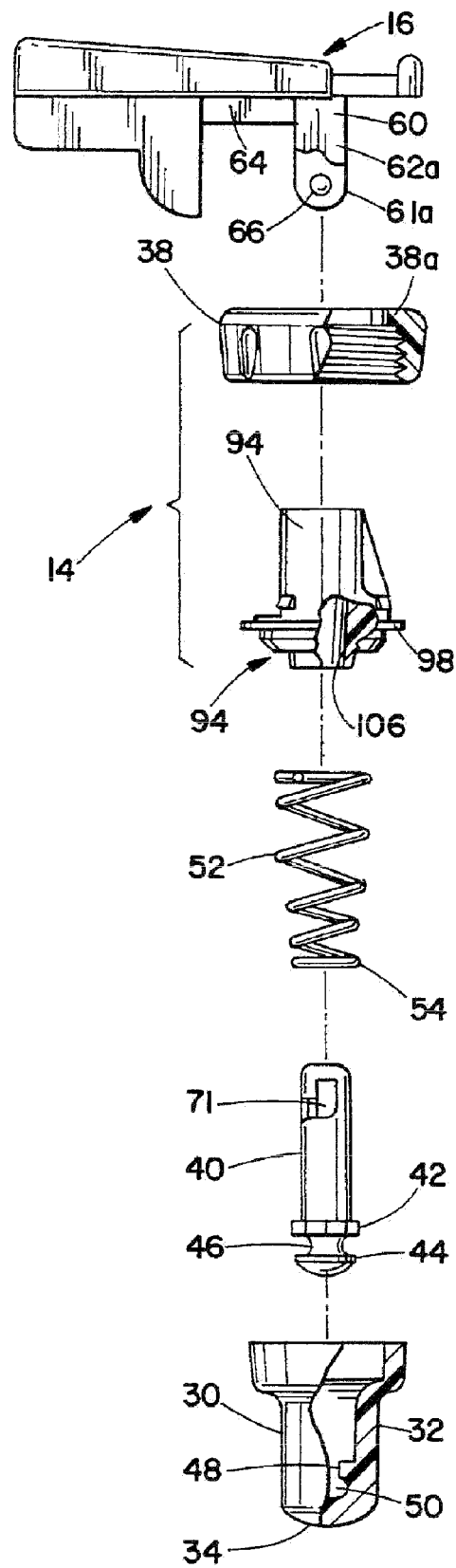

[FIG. 4]
200
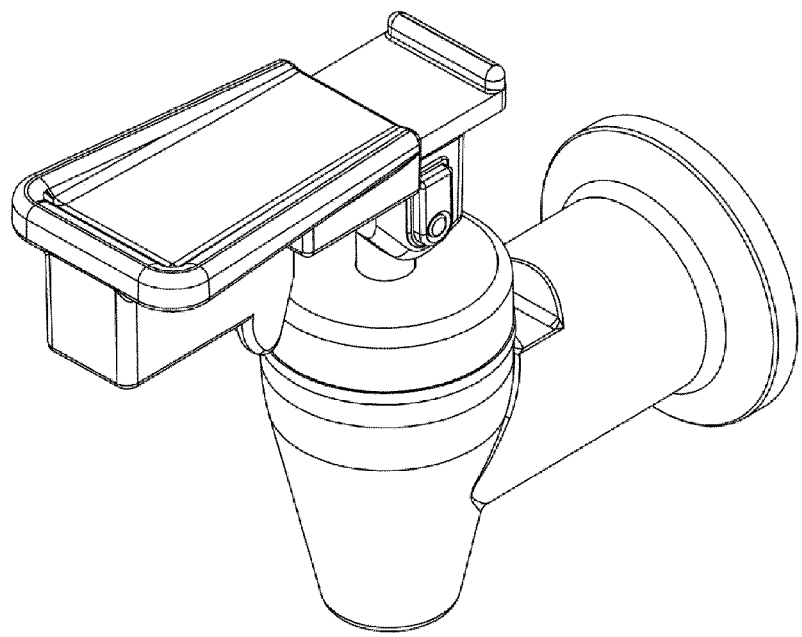

[FIG. 5]
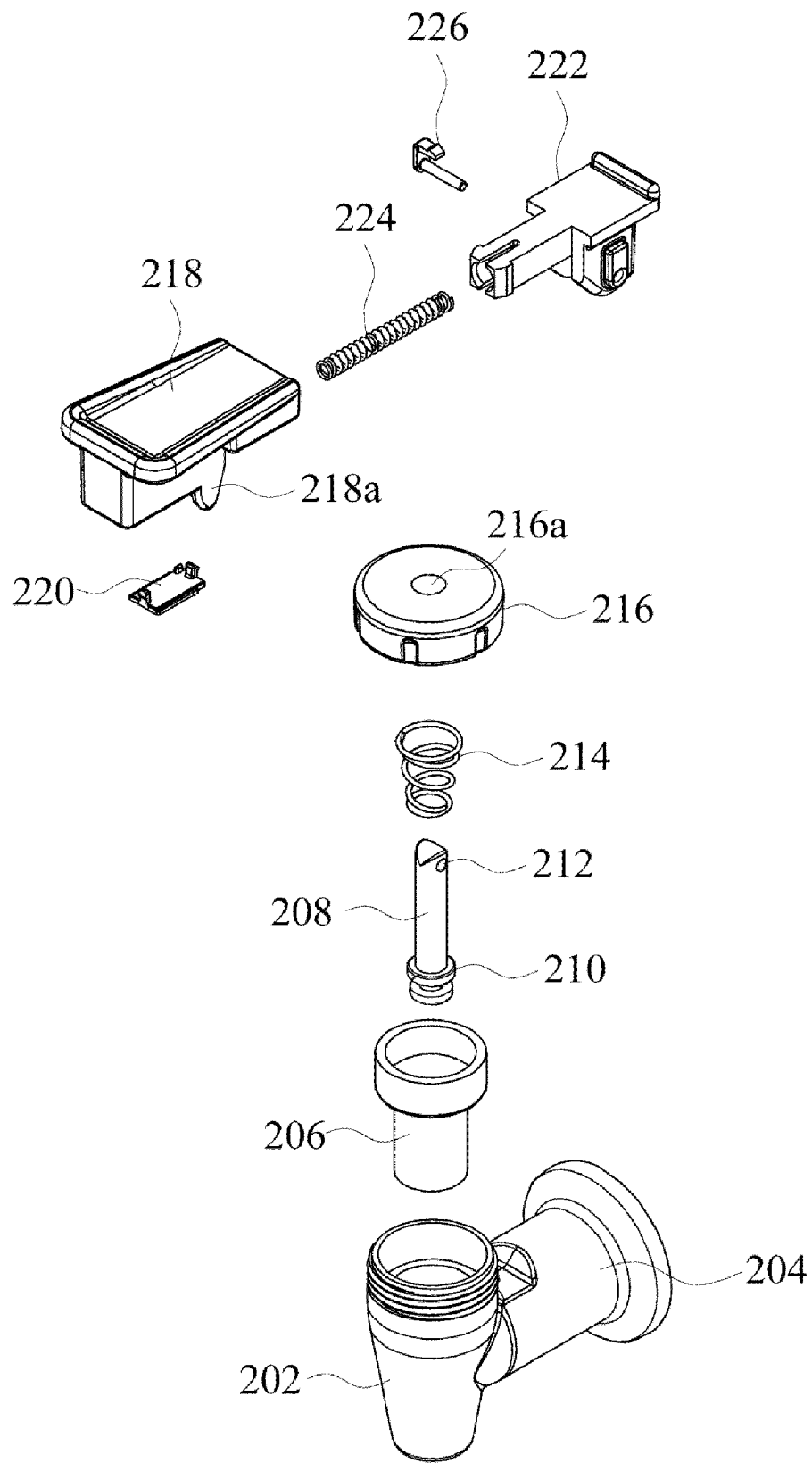

[FIG. 6]
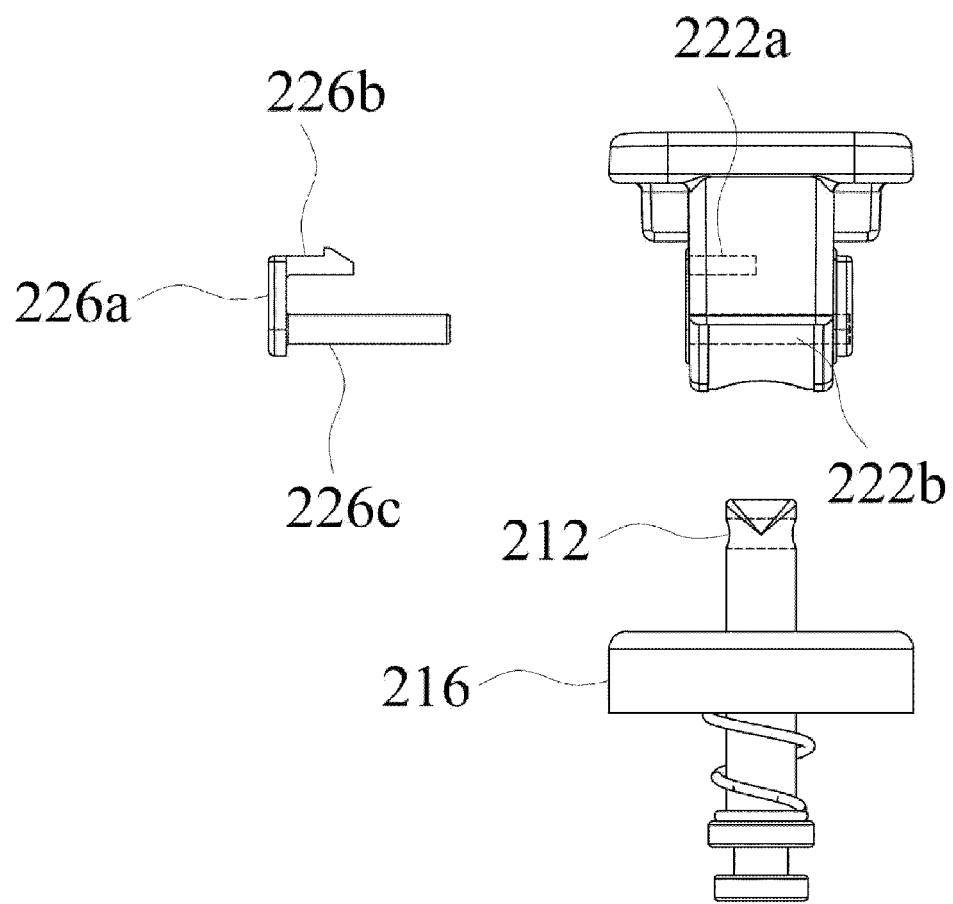

[FIG. 7]
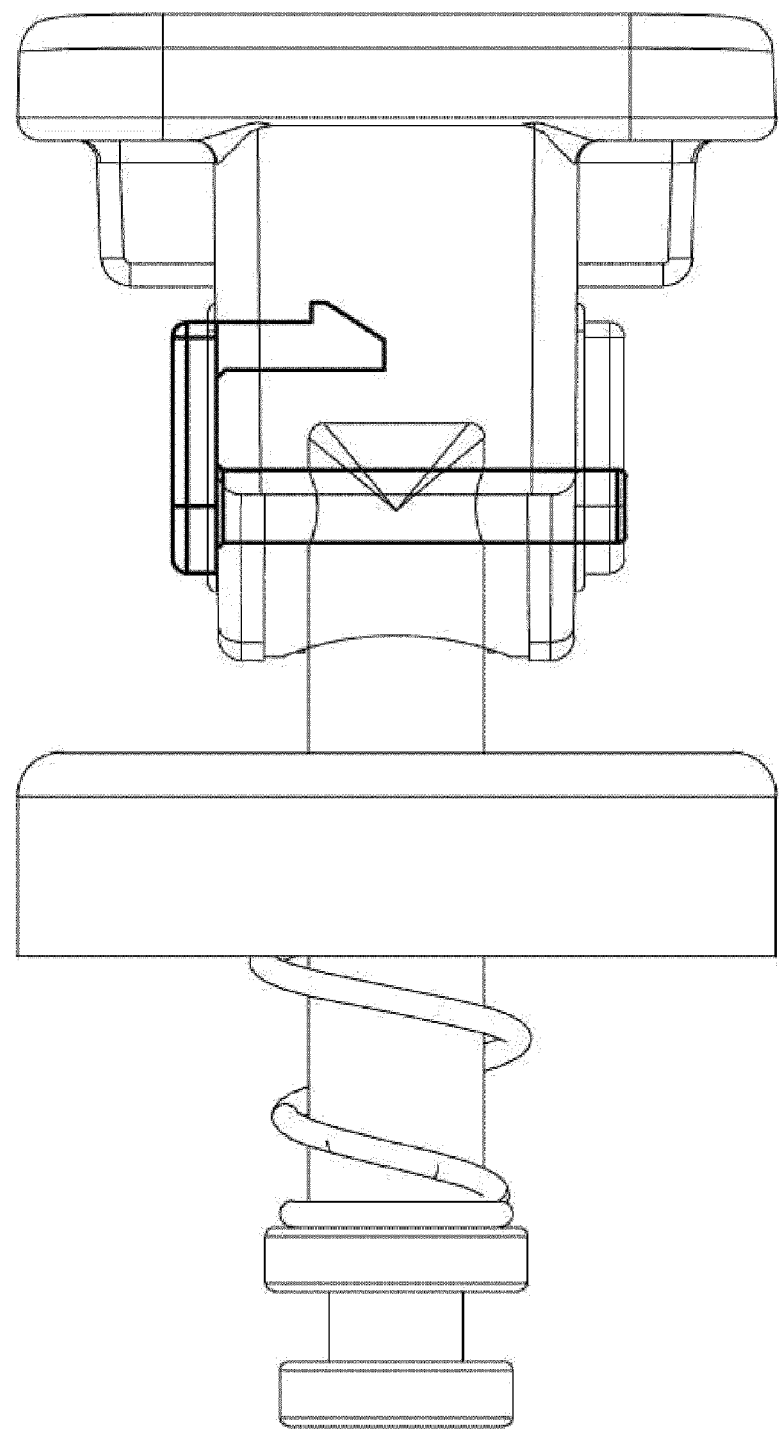

[FIG. 8]
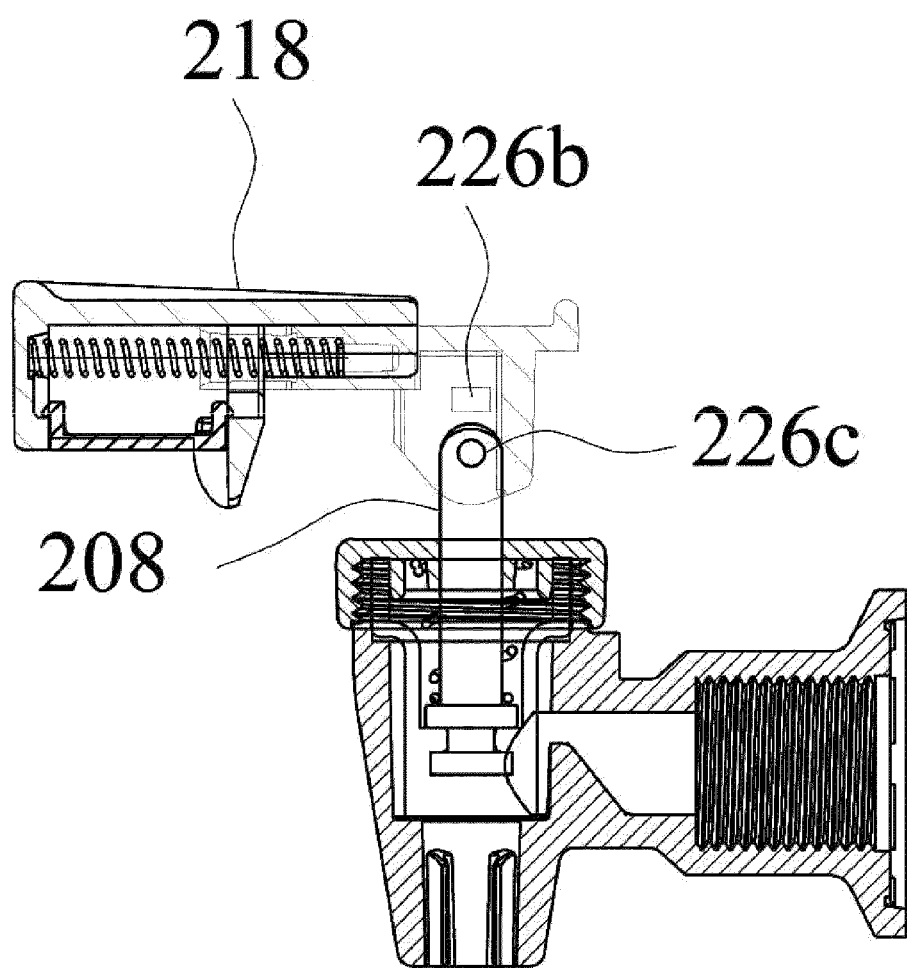

[FIG. 9]
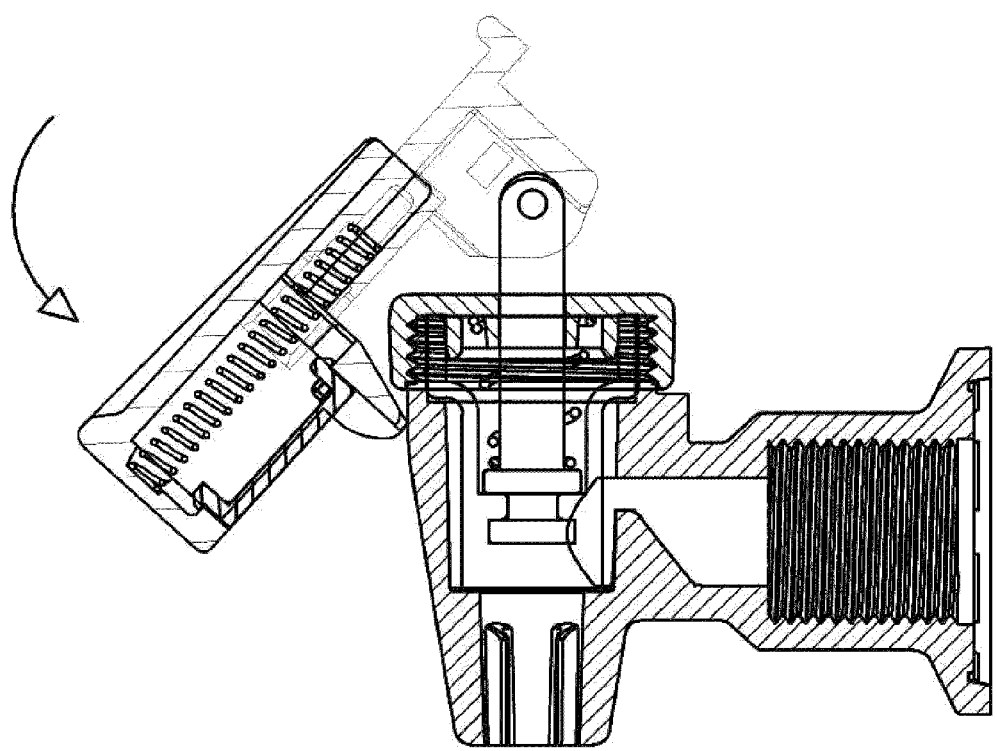

[FIG. 10]
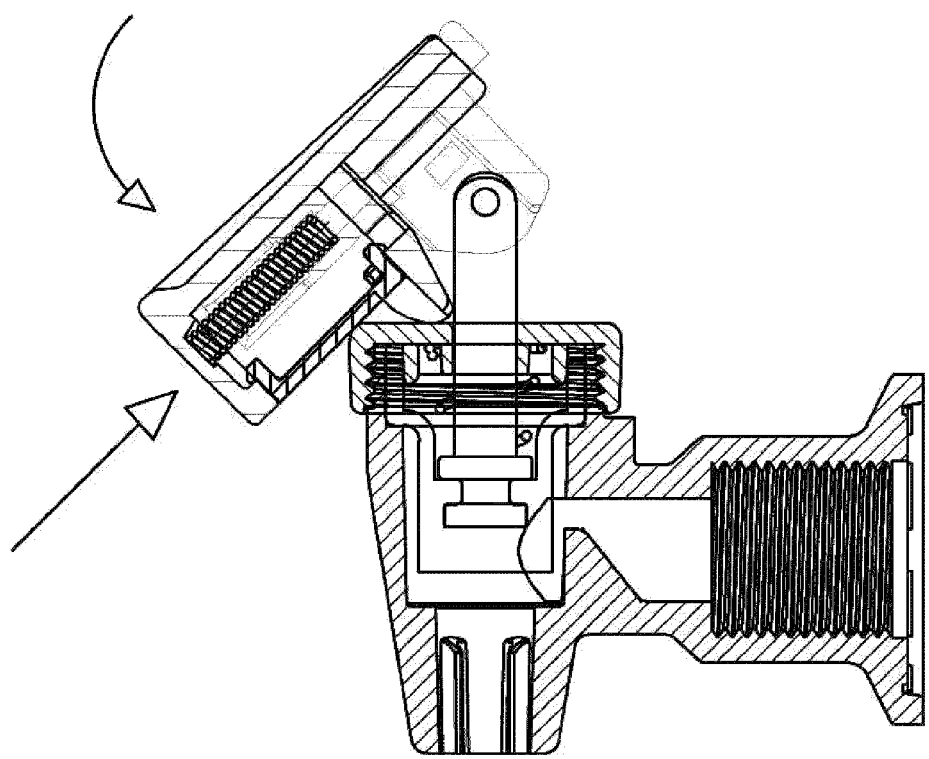

[FIG. 11]
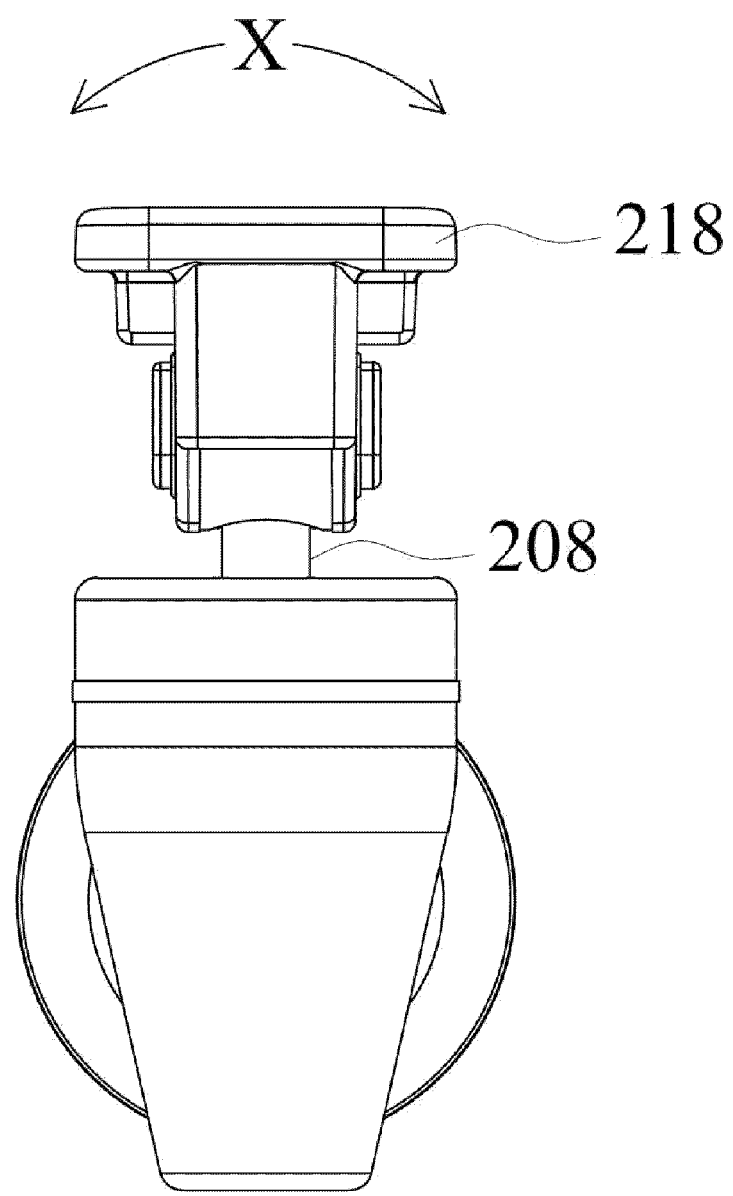

[FIG. 12]
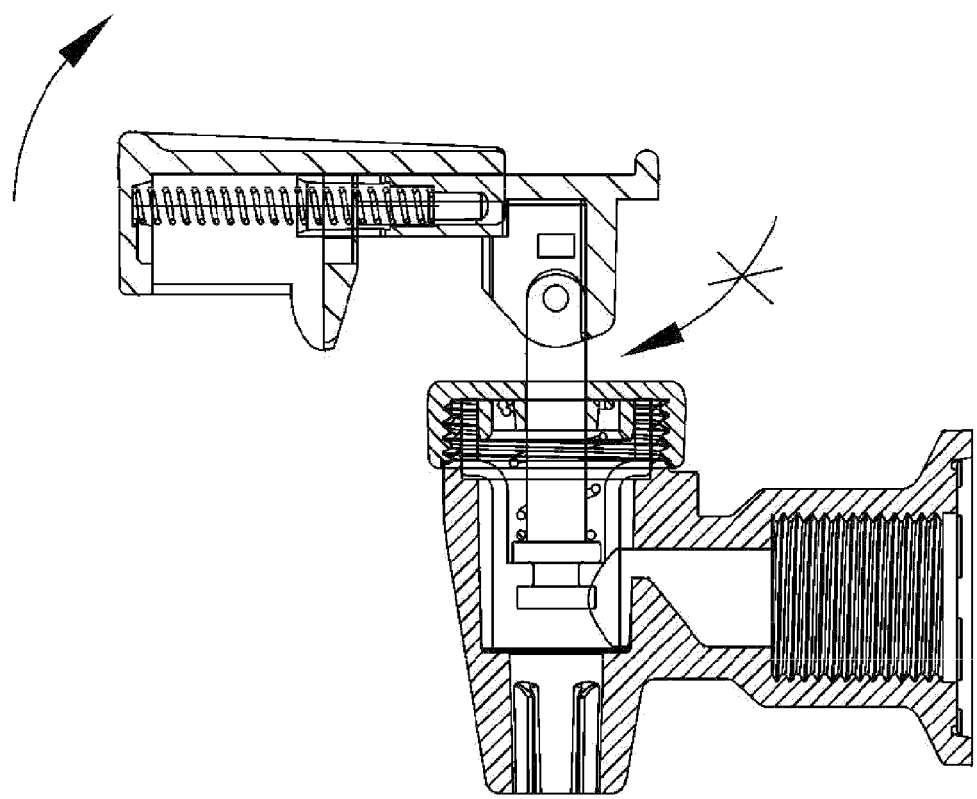

SAFETY FAUCET FOR HOT WATER

TECHNICAL FIELD

The present invention relates to a safety faucet for hot water, and more particularly, a safety faucet for hot water which: has a safety button which is positioned in front of a lever and slidingly moves in the front/back direction, and when the safety button is pressed, a cap contacting part on the lower end of the safety button rotates while forming a support point with respect to the upper surface of an upper cap; and has a fixed pin, which passes through an insertion groove formed on the upper end of an operation shaft, fixed together with the body of the lever, thereby preventing the lever from shaking left and right.

BACKGROUND ART

A hot water outlet of a cold/warm water purifier or a cold and hot water dispenser is provided with a safety device to prevent scald due to discharge of hot water.

Generally, a method in which hot water is discharged only when user presses a lever for hot water discharge while pressing a safety member such as a button or a rotating member is employed. The safety member can adjust the discharge of hot water by changing a position of a support point for serving as a prize when pressing the lever.

FIG. 1 is a perspective view showing a structure of a safety faucet according to a related art, FIG. 2 is a cross sectional view showing an internal configuration of the safety faucet of FIG. 1, and FIG. 3 is an exploded view showing components of the safety faucet of FIG. 1.

The safety faucet 10 of a related art includes a valve element 30 for blocking or opening an outflow path while vertically moving in a body 12 having a water inlet 18 and a water outlet 20, an operation shaft 40 coupled with the valve element 30 and moving together with the valve element 30, a spring 52 for restoring movement of the operation shaft 40, an insert member 94 for minimizing the movement of the lever, a bonnet 38 for sealing an upper opening of the body 12, and a handle assembly 16 which vertically moves the operation shaft 40 due to leverage.

A groove 71 is formed in the upper end of the operation shaft 40 in the left-right direction. A leg 61a, 62a of the handle assembly is rotatably coupled to the groove 71. A pivot pin 66 protruding inward from the left and right directions is fitted to the lower end of the leg 61a and 62a from the right and left sides of the groove 71, so that a lever body 64 and the operation shaft 40 are coupled.

The user presses a cam actuator 68 to allow a cam surface 76 to rise to the upper surface of the bonnet 38. When a lever body 64 is pressed downward, the cam surface 76 comes into contact with the upper surface of the bonnet 38 to form a support point, and the opposite leg 61a, 62a moves upward while the lever body 64 rotates around the support point. As the operation shaft 40 is lifted by that force, the valve element 30 is also raised. When the valve element 30 blocking an outflow path rises, the hot water flows out from the water inlet 18 to the water outlet 20.

However, in this structure, since a pivot pin 66 is inserted from the left and right sides and fixed in the groove 71 formed in the operation shaft 40, the coupling between the lever body 64 and the operation shaft 40 is not firm. If user shakes the lever body 64 from the front side to the left and right sides, vibration is generated in the lateral direction around the pivot pin 66. If the lever body 64 is excessively shaken from side to side, hot water may be discharged due to contact between the leg 61a, 62a and the bonnet 38.

In order to solve such a problem, in a related art, an insert member 94 of a rigid material which surrounds the operation shaft 40 is used. Due to the insert member 94, there is an effect of minimizing the left and right twist of the leg 61a, 62a and the movement when the lever is lifted upward. However, due to the addition of such a configuration, there is a problem that the structure of the safety faucet becomes complicated, the manufacturing cost increases, and the foreign substance is wedged in the insert member 94.

Further, since the bottom surface of an area where a spring 78 used for restoration of the cam actuator 68 is installed is opened, there is a problem that the spring 78 is separated and falls on a water cup.

DISCLOSURE

Technical Problem

In order to solve the above-mentioned problems, according to the present invention, a relatively elongated insertion groove is formed in an upper end of an operation shaft, a latching jaw and a pin are formed respectively in the upper and lower ends of a fixing pin, and the latching jaw and the pin are inserted and fixed to the side surface of a lever so that a lever is prevented from swaying from side to side with respect to the operation shaft.

Technical Solution

In order to solve the above-described problems, there is provided a safety faucet for hot water which is provided in a hot water discharge side to selectively close or open a hot water discharge path, the safety faucet including: a discharge pipe 202 which has a hot water discharge path formed therein; a packing 206 which moves up and down inside the discharge pipe 202 to close or open the hot water discharge path; an operation shaft 208 which is fixed to the packing 206, and has an insertion groove 212 penetrating through an upper end of left and right sides of the operation shaft 208; an upper cap 216 which covers an upper opening of the discharge pipe 202, and has an upper cap through-hole 216a formed in a center thereof to expose an upper end of the operation shaft 208; a lever 218 which is rotatably coupled to the upper end of the operation shaft 208; a safety button 218 which is coupled to a front of the lever 222 to be slidable in a forward and backward directions with respect to the lever 222, and has a cap contact portion 218a protruding from a lower end of the safety button 218 to form a support point generated by meeting with an upper surface of the upper cap 216; and a fixing pin 226 having one side of a connecting portion 226a where a latching jaw 226b which is fitted and fixed to a latching groove 222a formed in the lever 222 and a pin 226c which is fixed through the insertion groove 212 formed in the upper end of the operation shaft 208 are formed, wherein the lever 222 and the operation shaft 208 are rotatably coupled by the fixing pin 226.

The safety faucet further includes a cover 220 which is installed in the lower end of the safety button 218 to prevent a safety button spring 224 from being separated.

The lower end of the lever 222 and the upper surface of the upper cap 216 are spaced apart from each other by a safety distance so that, when the lever 222 is lifted up and rotated, an end of a rear portion of the lever 222 is in contact with the upper end of the operation shaft 208.

Advantageous Effects

According to the present invention, the safety button does not form a support point with the upper surface of the upper cap, even when the lever is excessively shaken left and right, and thus the present invention has the effect of preventing an accident where hot water is unintentionally discharged.

DESCRIPTION OF DRAWINGS

FIG. 1 is a perspective view illustrating a structure of a safety faucet according to a related art.

FIG. 2 is a cross-sectional view illustrating an internal configuration of the safety faucet of FIG. 1.

FIG. 3 is an exploded view illustrating a component of the safety faucet of FIG. 1.

FIG. 4 is a perspective view illustrating a structure of a safety faucet according to an embodiment of the present invention.

FIG. 5 is an exploded perspective view illustrating a configuration of the safety faucet of FIG. 4.

FIG. 6 is a cross-sectional view illustrating a coupling relationship between a lever and a fixing pin.

FIG. 7 is a cross-sectional view illustrating a state in which a lever and a fixing pin are coupled.

FIG. 8 is a cross-sectional view illustrating a coupling relationship between a safety button and a lever.

FIG. 9 is a cross-sectional view illustrating an operation when a lever is pressed without pressing a safety button.

FIG. 10 is a cross-sectional view illustrating an operation when a lever is pressed while a safety button is pressed.

FIG. 11 is a front view illustrating a left-right operation of a lever.

FIG. 12 is a cross-sectional view illustrating an operation when a lever is lifted upward.

MODE FOR INVENTION

Hereinafter, a "safety faucet for hot water" (hereinafter, referred to as a "safety faucet") according to an embodiment of the present invention will be described with reference to the drawings.

FIG. 4 is a perspective view illustrating a structure of a safety faucet according to an embodiment of the present invention, FIG. 5 is an exploded perspective view illustrating a configuration of the safety faucet of FIG. 4, FIG. 6 is a cross-sectional view illustrating a coupling relationship between a lever and a fixing pin, and FIG. 7 is a cross-sectional view illustrating a state in which a lever and a fixing pin are coupled.

A safety faucet 200 according to the present invention is installed in a hot water discharge side of a cold and hot water dispenser or a cold/warm water purifier. When user presses a lever 222 while pressing a safety button 218, a hot water discharge path is opened and hot water is discharged.

A discharge pipe 202 through which hot water is discharged generally has a cylindrical shape in the vertical direction, and a packing 206 is inserted into the discharge pipe 202. The packing 206 serves to block or open the hot water discharge path between a hot water induction pipe 204 and the discharge pipe 202.

The packing 206 moves up and down by the operation of the lever 222, and the packing 206 moves up and down together with an operation shaft 208 inserted inside the discharge pipe 202. The lower end of the operation shaft 208 is inserted into the packing 206. In the lower end of the operation shaft 208, a packing locking part 210 is protruded and toughly fixed inside the packing 206.

An insertion groove 212 is formed through the upper end of the operation shaft 208 in the right and left directions. A pin 226c protruding from the lower end of the fixing pin 226 is inserted into the insertion groove 212. The pin 226c, which is fitted in a pin through hole 222b formed in the right and left direction at the protruding portion in the lower portion of the lever 222, penetrates the insertion groove 212 formed in the upper end of the operation shaft 208 at the same time. Thus, the lever 222 and the operation shaft 208 are coupled, and when the lever 222 is pressed, the operation shaft 208 can be moved up and down by the leverage.

An operation shaft spring 214 is installed between an upper cap 216 and the packing 206 to surround the operation shaft 208. The elastic force of the operation shaft spring 214 pushes the packing 206 in the opposite direction of the upper cap 216 to block the discharge pipe 202.

The upper cap 216 is a means for blocking an upper opening of the discharge pipe 202, and allows the upper end of the operation shaft 208 to be exposed to the outside through an upper cap through-hole 216a formed in the center of the upper cap 216. The upper end of the operation shaft 208 exposed to the outside of the upper cap 216 is rotatably coupled with the lever 222.

The safety button 218 and the lever 222 are coupled with each other so that user can press them by hand. When the user simultaneously presses the lever 222 while pressing the safety button 218, hot water is discharged.

The safety button 218 is installed in front of the lever 222, and is installed to be slidable in the front/back direction with respect to the lever 222. A rail or a guide may be formed in a portion where the safety button 218 and the lever 222 are coupled.

A cover 220 is installed in the lower end of the safety button 218. The cover 220 is installed inside the safety button 218 to prevent a safety button spring 224 from being separated to the outside.

The safety button 218 and the lever 222 are coupled to be movable in the front/back direction. Since the lever 222 is coupled with the operation shaft 208 and fixed in place, the front safety button 218 moves in the front/back direction.

The safety button spring 224 is interposed between the safety button 218 and the lever 222, and the safety button 218 is moved in a direction away from the lever 222, that is, is moved forward by the elastic force of the safety button spring 224.

A cap contact portion 218a is protruded from the lower end of the safety button 218. The cap contact portion 218a is a portion in contact with the upper surface of the upper cap 216. The cap contact portion 218a and the upper surface of the upper cap 216 serve as a support point for leverage, so that the lever 222 can pull up the operation shaft 208.

The cap contact portion 218a is positioned outside a virtual surface extending in the vertical direction from the upper surface of the upper cap 216 when user does not press the safety button 218. When the user presses the safety button 218, the cap contact portion 218a moves backward and the cap contact portion 218a is positioned inside the virtual surface. This forms a support point in the upper cap 216.

The lever 222 is rotatably connected to the upper end of the operation shaft 208. The lever 222 performs a reciprocating rotational motion within a certain range about a point, as an axis, coupled with the operation shaft 208.

The operation shaft 208 and the lever 222 are coupled by the fixing pin 226. The fixing pin 226 has a shape in which a latching jaw 226*b* and a pin 226*c* protrude from one side of a connecting portion 226*a* formed in the longitudinal direction. In general, the latching jaw 226*b* and the pin 226*c* are formed in one side of the connecting portion 226*a* at the same time, but may have different a configuration.

The latching jaw 226*b* and the pin 226*c* are inserted into a latching groove 222*a* and the pin through hole 222*b* formed in one side of the lever 222, respectively. A step formed in the end of the latching jaw 226*b* prevents the fixing pin 226 from being easily separated from the lever 222 while being caught by the inner rim of the latching groove 222*a*.

The pin 226*c* penetrates the body of the lever 222, and the upper end of the operation shaft 208 is inserted into the body of the lever 222 by a certain height. The pin 226*c* is inserted through the insertion groove 212 of the operation shaft 208 which is received in the body of the lever 222. It is preferable that the inner diameter and the outer diameter of the insertion groove 212 and the pin 226*c* are substantially equal to each other and the shape of the cross section becomes circular, thereby performing rotational motion without being shaken from side to side.

As shown in FIG. 7, the operation shaft 208 is firmly fixed to the lever 222 by the fixing pin 226.

FIG. 8 is a cross-sectional view illustrating a coupling relationship between a safety button and a lever, FIG. 9 is a cross-sectional view illustrating an operation when a lever is pressed without pressing a safety button, FIG. 10 is a cross-sectional view illustrating an operation when a lever is pressed while a safety button is pressed, and FIG. 11 is a front view illustrating a left-right operation of a lever.

The safety button 218 maintains a state of being moved farthest from the lever 222 and the operation shaft 208 by the elastic force of the safety button spring 224. In this state, since the cap contact portion 218*a* is positioned outside the upper cap 216, the support point is not formed even when the end portion of the safety button 218 is pressed downward, so that the operation shaft 208 does not move upward (see FIG. 9).

However, after the safety button 218 is pushed backward to move toward the lever 222, when the safety button 218 is pushed downward, the cap contact portion 218*a* is positioned inside the upper cap 216 to form a support point. The lever 222 rotates about the pin 226*c* of the fixed pin 226, and the operation shaft 208 is lifted upward due to leverage. As a result, hot water is discharged while the packing 206 is lifted together.

In addition, since the pin 226*c* protruding from the fixing pin 226 is fixed to the body of the lever 222 in a state where the pin 226*c* penetrates through the operation shaft 208, a double coupling structure is achieved, and the safety button 218 or the lever 222 is not shaken or twisted in the left and right direction with respect to the operation shaft 208.

FIG. 12 is a cross-sectional view illustrating an operation when a lever is lifted upward.

As shown in FIG. 12, when the lever 222 is lifted up without pressing the safety button 218, the wall of the rear portion of the lever 222 contacts the upper portion of the operation shaft 208. Thus, the lever 222 does not rotate upward, and no contact is achieved between the rear portion of the lever 222 and the upper cap 216. As a result, a point of application of the lever does not occur, so that the operation shaft 208 is not lifted up and hot water is not discharged either.

A safety distance of a certain size is formed between the lower end of the lever 222 and the upper surface of the upper cap 216. The safety distance means a space which allows the lever 222 and the upper cap 216 not to be in contact with each other. Due to the existence of the safety distance, even if the lever 222 is shaken from side to side, the lever 222 is still maintained to be spaced from the upper cap 216. Therefore, even if the lever 222 is shaken or twisted, the operation shaft 208 is not pulled, thereby preventing an accident where hot water is discharged.

The safety distance between the lower end of the lever 222 and the upper surface of the upper cap 216 is greater than the length (the distance between the central axis of the operation shaft 208 and the end of the rear portion) of the rear portion of the lever 222. Thus, when the lever 222 is lifted up, the rear portion of the lever 222 rotates and comes into contact with the upper end of the operation shaft 208, but does not contact the upper surface of the upper cap 216.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A safety faucet which is provided in a hot water discharge side to selectively close or open a hot water discharge path, the safety faucet comprising:
   a discharge pipe which has a hot water discharge path formed therein;
   a packing which moves up and down inside the discharge pipe to close or open the hot water discharge path;
   an operation shaft which is fixed to the packing, and has an insertion groove penetrating through an upper end of left and right sides of the operation shaft;
   an upper cap which covers an upper opening of the discharge pipe, and has an upper cap through-hole formed in a center thereof to expose an upper end of the operation shaft;
   a lever which is rotatably coupled to the upper end of the operation shaft, wherein a latching groove and a pin through hole are formed in one side of the lever, respectively;
   a safety button which is coupled to a front of the lever to be slidable in a forward and backward directions with respect to the lever, and has a cap contact portion protruding from a lower end of the safety button to form a support point generated by meeting with an upper surface of the upper cap;
   a safety button spring which is interposed between the safety button and the lever, and the safety button moved in a direction away from the lever by an elastic force of the safety button spring;
   a cover which is installed in the lower end of the safety button to prevent the safety button spring from being separated; and
   a fixing pin comprising a connecting portion, a latching jaw, and a pin,
   wherein the latching jaw is attached to an upper portion of an one side of the connection portion and fixed to the latching groove formed in the lever and the pin is attached to a lower portion of the one side of the connecting portion and fixed through the insertion groove formed in the upper end of the operation shaft,
   wherein the lever and the operation shaft are rotatably coupled by the fixing pin, wherein the one side of the connecting portion is in contact with one side of the lever by the latching jaw being fixed to the latching groove and the pin being fixed to the pin through hole.

2. The safety faucet of claim 1, wherein the lower end of the lever and the upper surface of the upper cap are spaced apart from each other by a safety distance so that, when the lever is lifted up and rotated, an end of a rear portion of the lever is in contact with the upper end of the operation shaft.

* * * * *